United States Patent
Coulbeck et al.

(10) Patent No.: US 11,326,105 B2
(45) Date of Patent: May 10, 2022

(54) MULTI-AMINE POLYESTER DISPERSANT MADE VIA AN ANHYDRIDE INTERMEDIATE

(71) Applicant: Lubrizol Advanced Materials, Inc., Cleveland, OH (US)

(72) Inventors: Elliot Coulbeck, Manchester (GB); Dean Thetford, Manchester (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 261 days.

(21) Appl. No.: 16/647,732

(22) PCT Filed: Sep. 18, 2018

(86) PCT No.: PCT/US2018/051449
§ 371 (c)(1),
(2) Date: Mar. 16, 2020

(87) PCT Pub. No.: WO2019/060278
PCT Pub. Date: Mar. 28, 2019

(65) Prior Publication Data
US 2020/0230561 A1 Jul. 23, 2020

Related U.S. Application Data

(60) Provisional application No. 62/560,317, filed on Sep. 19, 2017.

(51) Int. Cl.
*C08G 63/91* (2006.01)
*C09K 23/00* (2022.01)
*C08G 73/02* (2006.01)
*C08G 69/44* (2006.01)
*C09D 167/02* (2006.01)
*C09D 177/12* (2006.01)
*C09K 23/16* (2022.01)

(52) U.S. Cl.
CPC ............. *C09K 23/00* (2022.01); *C08G 63/91* (2013.01); *C08G 69/44* (2013.01); *C08G 73/02* (2013.01); *C09D 167/02* (2013.01); *C09D 177/12* (2013.01); *C09K 23/16* (2022.01)

(58) Field of Classification Search
CPC ........ C09K 23/00; C09K 23/16; C08G 63/91; C08G 69/44; C08G 73/02; C08G 81/00; C08G 81/025; C09D 167/02; C09D 177/12; C09B 67/009
See application file for complete search history.

(56) References Cited

U.S. PATENT DOCUMENTS

| | | | |
|---|---|---|---|
| 6,197,877 B1 | 3/2001 | Thetford et al. | |
| 2002/0169251 A1* | 11/2002 | He | C08F 8/00 524/599 |
| 2003/0009004 A1* | 1/2003 | Nam | C08L 53/00 528/272 |
| 2010/0174046 A1 | 7/2010 | Liu et al. | |
| 2014/0012036 A1* | 1/2014 | Omeis | C09D 17/002 560/158 |

FOREIGN PATENT DOCUMENTS

| | | |
|---|---|---|
| EP | 0208041 A2 | 1/1987 |
| WO | 2006113258 A1 | 10/2006 |
| WO | 2006113258 A2 | 10/2006 |

OTHER PUBLICATIONS

Forrest, M.L., et al.; Pharmaceutical Research, 2004, vol. 21, No. 2, p. 365-371.*
PCT Written Opinion of the International Searching Authority, dated Jul. 19, 2019.
PCT International Search Report, dated Jul. 19, 2019.
PCT International Search Report, dated Dec. 13, 2018.
PCT Written Opinion of the International Searching Authority, dated Dec. 13, 2018.

* cited by examiner

*Primary Examiner* — Robert S Jones, Jr.
(74) *Attorney, Agent, or Firm* — Vincent Cortese; Teresan Gilbert; The Lubrizol Corporation

(57) ABSTRACT

The present invention relates to a dispersant derived from anhydride functionalized polyester derived from carboxylic acid functionalized polyester. The anhydride functionalized polyester is then reacted with a multi-amine species forming amide and salt bonds. The technology allows lower reaction temperatures when the multi-amine species is present. The lower reaction temperature allows the use of a broader selection of polyester repeat units.

14 Claims, No Drawings

MULTI-AMINE POLYESTER DISPERSANT MADE VIA AN ANHYDRIDE INTERMEDIATE

This application claims priority from PCT Application Serial No. PCT/US2018/051449, filed on Sep. 18, 2018, which claims the benefit of U.S. Provisional Application No. 62/560,317, filed on Sep. 19, 2017.

FIELD OF INVENTION

The present invention relates to a dispersant of a multi-amine species (a polyamine such as polyethyleneimine) reacted with multiple polyester chains via an anhydride intermediate. The carboxylic acid chain ends of the polyester are converted to anhydride groups by dehydration prior to the reaction with the multi-amine containing species.

BACKGROUND OF THE INVENTION

Polyamine derived dispersants are well known and are in general very effective pigments dispersants. The composition and molecular weight of the steric stabilization chains of these dispersants are critically important, both for the solubility of the dispersant and its physical form. It is well known that dispersants based on polyester co-polymers can offer fluidity and broader solubility in a variety of non-aqueous media of differing polarity.

EP208041 discloses a method where the mono acid functional polyester is heated with the polyamine, polyethyleneimine (PEI) in this case, at 120° C. for multiple hours to allow for the loss of water and the formation of some amide bonds, but not all of the polyester chains are attached to the PEI and hence some remain as salt bond/linkages.

Dispersants based on polyethyleneimine that also contain polyesters are well known. Examples include U.S. Pat. No. 6,197,877 where the "traditional" coupling approach of reacting a carboxylic acid ended polyester with PEI above 100° C. to form some amide bonds, while leaving some salt bonds.

US 2010/0174046 discloses a method for making the polyester chains in situ, by having the polyamine (PEI in this case) in the reaction at the start using the amine groups as an initiator to ring open lactones, this results in a dispersant with polyester chains attached to the polyamine predominately with amide bonds. This reaction is usually carried out at temperatures above 125° C. and again can involve the elimination of water where hydroxyl carboxylic acids are used as co-monomers.

U.S. Pat. No. 9,039,822 uses lactic acid (not lactide) and is the "traditional" approach of synthesizing the polyester first and coupling thereafter. These agents are used on ceramic inkjet pigments. Note that the polyester is carboxylic acid ended at one end and mainly —OH ended at the other. There is probably a small % of the polymers that are —H ended in example A and B as ricinoleic acid often contains low % of oleic acid. However, the examples that contain lactone as the co monomer with lactic acid are purely —OH ended.

However, these prior art processes have some inherent flaws, water removal from the reaction vessel has to be efficient, otherwise the reaction will be very slow, which in turn can lead to side reactions occurring. These side reactions include hydrolysis of the ester groups in the polyester chain (cleaving the polyester into two smaller polyester chains), or the primary or secondary amine groups of the polyamine react with the ester functionalities of the polyester (cleaving the polyester into two smaller polyester chains and attaching one of the cleaved polyester segments to the polyamine via an amide bond).

Secondly, the prior art reaction has to be carried out at above 100° C. and preferably higher (such as above 140° C.) to allow for the best removal of water from the system (see above), however at this point the free amine groups of the polyamine are present in the reaction mixture and are therefore exposed to these high temperatures. Many polyamines will readily darken when at elevated temperatures especially if these reaction times are long and so can have negative consequences in some application areas such as white paint formulations.

It would be desirable if polyesters could be grafted onto polyamines at a lower temperature or under more mild conditions so that less degradation and yellowing of the polyamine would occur during synthesis of the graft copolymer.

Many formulations such as inks, paints, millbases and plastics materials require effective dispersants for uniformly distributing a particulate solid in a polar organic medium or a non-polar organic medium. The pigment dispersion should be compatible with the different ink or coating formulations.

SUMMARY OF THE INVENTION

One objective was to make new improved dispersants based on a polyamine species reacted with multiple polyester chains. There were concerns about yellowing of the polyester polyamine dispersants made both by the traditional approach (carboxylic acid ended polyester reacted with polyamine) and by the grafting approach (polyamine initiated polymerization of lactones) where high temperature reaction conditions were used, as described in US 2010/0174046 and US 2014/0012036.

Another objective is to prepare graft co-polymers comprising polyester chains grafted onto polyamines under more controlled reaction conditions than in the prior art such that undesirable side reactions can be minimized, molecular weight and architecture of the polyester polyamine dispersant can be better controlled to result in more consistent product and less variability of the product due to molecular weight and microstructure variations.

It was found that when polyesters with terminal carboxylic acid groups were converted to their polyester acid anhydride (by a dehydration reaction with a low molecular weight monocarboxylic acid anhydride such as acetic anhydride), the polyester anhydride intermediate could be reacted with the primary and/or secondary amine groups of a polyamine at a lower temperature (such as below 100° C.) to form amide and salt linkages between the carboxylic functionality of the polyester and the amine functionality of the polyamine. This resulted in the formation of polyester polyamine dispersants which were less yellow in colour compared to prior art. These lower temperatures also resulted in less reaction between the amine atoms and the ester linkages of the polyester chains, (resulting in less polyester chain scission), this is most notable when the polyester comprises of highly labile monomers such as lactide. This process also eliminated the presence of water in the formation of the dispersants to minimize or eliminate ester hydrolysis (chain scission of the polyester chain) and the formation of smaller polyester chains.

We have developed the new method where the polyamine is only exposed to lower temperatures, such as <100° C., for much shorter reaction times and wherein the formation of the potential water from making an amide bond from the reaction of the amine group with a carboxylic acid has been removed, the reaction conditions to make the polyester polyamine dispersant is much less dependent on removing a large amount of water and therefore the reaction conditions to achieve complete or almost complete reaction of the polyester with the polyamine is much less dependent on reaction vessel size and shape.

The problem of chain scission is evident by the lack of operative examples that contain lactic acid, lactide, glycolic acid and glycolide monomers, even when they are disclosed in the literature. These monomers contain labile carbonyl groups and as such are more prone to chain scission in comparison to other monomers such as caprolactone and 12-hydroxysteric acid.

In one embodiment, it was found that when lactide was incorporated into a polyester and the polyester was then reacted with a polyamine species (such as PEI) at temperatures above 100° C. (such as 120° C.), there was apparent chain scission at the ester groups of the polyester chain and this resulted in dispersants that did not perform well as dispersants. While not wishing to be bound by theory, it is anticipated that under the reaction conditions used, the amine groups were reacting at a significant rate with the ester linkages of the polyester chain causing chain scission. It was also anticipated that dispersants with random low molecular weight polyester chains do not function as well as dispersants with controlled molecular weight polyester chains (that can be optimized for efficiency in a particular solvent with a particular pigment).

In one embodiment, it has been found that when the above-mentioned labile monomers such as lactide are incorporated into a polyester they can be attached to a polyamine species (such as PEI) by first converting them into polyester anhydride and then reacting with the polyamine species for a short period of time a temperature lower than 100° C. Using this method, the chain scission is greatly reduced, leading to polyester chains of the required length attached to the polyamine species.

The dispersants resulting from these reactions showed good dispersing ability with a variety of pigments and other particulates in a variety of media. The dispersants were characterized by a low level of hydroxyl terminal groups (as hydroxyl groups tended to get consumed in reaction with the dehydrating agent) and chain scission to create new hydroxyl groups during reaction with the amine was reduced.

In one embodiment, the reactants used to form the polyester anhydride by dehydration of the carboxylic acid ended polyester can be removed from the polyester anhydride intermediate prior to the reaction with the multi-amine species.

In one embodiment, the reactants used to form the polyester anhydride may still be present when addition to the polyamine species takes place and hence modify it to a lesser or greater extent. If a volatile anhydride of two carboxylic acids is used to form the anhydride of the polyester, and if a volatile carboxylic acid or anhydride of carboxylic acids is not removed prior to the reaction with the multi-amine species, they can react with the multi-amine species to form an amide or salt linkage. This is not anticipated to be deleterious to the final dispersant as the preferred carboxylic acids or anhydrides tend to be volatile and low molecular weight and would not substantially change the hydrophilic/lipophilic character of the dispersant.

DETAILED DESCRIPTION OF THE INVENTION

For the sake of brevity, the summary of invention language description will not be repeated here. We will proceed to describe the structure of the dispersant, the changes to the dispersants that are considered viable, the method of making the dispersant, pre or post reaction modification of the dispersant, etc.

We have now discovered a way to reduce the yellowing of these polyester multi amine dispersants, second embodiment to attach these interesting lactide (a cyclized dimer of two lactic acid units) or lactic acid containing polyester co-polymers to PEI without chain scission occurring, leading to dispersants with levels of performance as expected.

The term hydrocarbyl will refer to monovalent hydrocarbon groups that may optionally include other heteroatoms (such as O and N) in conventional or specified amounts such as one oxygen and or nitrogen for every two or every ten carbon atoms in the group, but preferably just carbon and hydrogen. The term hydrocarbylene will refer to divalent hydrocarbon groups that may optionally include other heteroatoms such as O and N as defined for hydrocarbyl.

A dispersant of the following structure:

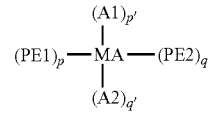

Formula 1 wherein:

MA is a multi-amine species and desirably has a number average molecular weight (MW) between 300 and 100,000 g/mole, preferably between 600 and 50,000 g/mole;

PE1 is a polyester chain of number average molecular weight (MW) between 500 and 4,000 g/mole attached to the multi amine species (MA) via an amide bond;

the carbonyl group is from the terminal group of PE1 and the nitrogen is from the MA;

PE2 is a polyester chain of number average molecular weight (MW) between 500 and 4,000 g/mole attached to the multi amine species (MA) via a salt linkage;

the deprotonated carboxylic acid group is from the terminal group of PE2 and the protonated nitrogen is from the MA; PE1 and PE2 can be mixtures of compositionally different polyester chains, but generally PE1 and PE2 are similar polyester chains but are attached differently (one via an amide bond and the other via a salt of the amine with a carboxylic acid group);

A1 is the residue of a $C_{2-5}$ carboxylic acid (preferably $C_{2-3}$) attached to the multi amine species (MA) via an amide bond, the carbonyl group is from the terminal group of A1 and the nitrogen is from the MA; and A2 is the residue of a $C_{2-5}$ carboxylic acid (preferably $C_{2-3}$) attached to the multi amine species (MA) via a salt linkage, the deprotonated carboxylic acid group is from the terminal group of A2 and the protonated nitrogen is from the MA.

The relative molar ratios of amide bonds represented by p and p' to salt linkages represented by q and q' are between 5:95 and 50:50;

p+p' can never be greater than q+q';

p is always 1 or greater than 1, and p' is 1 or greater than 1;

q is always 1 or greater than 1, and q' is 1 or greater than 1;

p+p'+q+q' is between 4 and 2000; more desirably p+q being from 4 to 36; and p'+q' being at least 2 or at least 4.

And the weight ratio of the polyesters (combination of PE1 and PE2) to the multi-amine species (MA) is desirably from 2:1-26:1; more desirably from 2:1-25:1; and preferably from 3:1-20:1; and wherein Formula 1 contains no more than 5 wt % of combined A1 and A2. The number average molecular weight of the dispersant is preferably not less than 2,000, more preferably not less than 2,500 and especially not less than 3,000. It is also preferred that the number average molecular weight of the dispersant is less than 1,000,000 more preferably less than 500,000 and most preferably less than 250,000 g/mole.

This dispersant is desirably made via a three-step process. According to the present invention, there is a method for forming a graft co-polymer of multiple polyester chains and a polyamine via an anhydride intermediate of carboxylic acid terminated polyester chains. The reaction to form the anhydride intermediate of the carboxylic acid ended polyester occurs at elevated temperature and can be facilitated by adding anhydrides of low molecular weight C2-5 carboxylic acids selected from the group consisting of acetic acid, propionic acid, and butyric acid.

Step 1 is the synthesis of a mono functional acid polyester which can be described as:

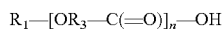

wherein:

$R_1$ is H— or $R_2C(=O)$—;

$R_2$ is a branched or linear, saturated or unsaturated hydrocarbon chain containing between 1 and 25 carbons atoms;

$R_3$ is a branched or linear, saturated or unsaturated hydrocarbon chain containing between 1 and 25 carbons atoms or —$R_4$—OC(=O)$R_5$—; and optionally up to 50 mole %, more desirably up to 30 mole % and preferably up to 20 mole % of the $R_3$ units (based on the total units of $R_3$) in a mono functional acid polyester contains a hydroxy pendant group or an oxygen atom (derived from the hydroxyl group) of an ester linkage with a polyester chain of the structure $R_1$—[$OR_3$—C(=O)]$_n$—; (this is shown in dispersant 20 in the examples and thus the polyester is predominantly the units shown with the option of a few percent (up to 20, 30, or 50 mole %) being branched ester units of a particular ester type where the branching is derived from a hydroxy branched or substituted version of (O—$R_3$));

$R_4$ is a branched or linear, saturated or unsaturated hydrocarbon chain containing between 2 and 30 carbons atoms, which may optionally contain 1 or more ether linkages;

$R_5$ is a branched or linear, saturated or unsaturated hydrocarbon chain containing between 1 and 20 carbons atoms; and n is between 3 and 43.

Hence, $R_1$—[$OR_3$—C(=O)]$_n$—OH describes a mono acid functional homo or co-polyester with a MW of between 500 and 4000.

This mono acid functional polyester can be synthesized by any method known to those skilled in the art but especially via either a) polymerization of lactones and/or lactides and/or hydroxycarboxylic acids optionally in the presence of monocarboxylic acids to initiate the polyester chain extension or b) polymerization reaction of a diol with a dibasic acid or derivatives thereof such as acid chlorides, anhydride or dialkylesters in the presence of a stoichiometric amount of monocarboxylic acid to control molecular weight and suppress formation of dihydroxy polyesters.

Examples of suitable hydroxyl carboxylic acids and lactones and lactides used to prepare the polyester chains include hydroxy-substituted C2-30 alkylene carboxylic acid, a hydroxy-substituted C4-30 alkenylene carboxylic acid, lactones or mixtures thereof. Specific examples of suitable hydroxy carboxylic acids are ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactide, glycolide, glycolic acid and lactic acid. Examples of the lactones is preferably optionally C1-4 alkyl substituted ε-caprolactone, optionally substituted C1-4 alkyl δ-valerolactone and β-propiolactone. The hydroxy carboxylic acids and lactones can also include di-hydroxy compounds of the same carbon range and substitution such as 2,2-bis(hydroxymethyl)butyric acid; 2,2-bis(hydroxymethyl)propionic acid, and similar dihydroxy carboxylic acids in the specified carbon range. These would form branched polyester that would still have one carboxylic acid terminal group per polyester wherein the carboxylic acid group could be converted to an anhydride as taught in this disclosure.

Use of the above described components to make the polyester portion of the dispersant will result in various $R_3$ groups. In one embodiment, the $R_3$ is a branched or linear, saturated or unsaturated hydrocarbon chain containing between 1 and 25 carbons atoms or —$R_4$—OC(=O)$R_5$—, wherein $R_4$ is a branched or linear, saturated or unsaturated hydrocarbon chain containing between 2 and 30 carbons atoms, which may optionally contain 1 or more ether linkages, $R_5$ is a branched or linear, saturated or unsaturated hydrocarbon chain containing between 1 and 20 carbons atoms, and n is between 3 and 43.

In another embodiment, at least 10 mole % (more desirably at least 20, and preferably at least 30 mole %) of the $R_3$ units are linear or branched alkyl groups of 1 to 5 carbon atoms (these $R_3$ assignments are representative of combinations of glycolic, lactic, caprolactone, and valerolactone). In another embodiment, at least 10 mole % (more desirably at least 20, and preferably at least 30 mole %) of the $R_3$ units are linear or branched alkyl groups of 4 and/or 5 carbon atoms (this is representative of cap or cap val). In another embodiment, at least 10 mole % (more desirably at least 20, and preferably at least 30 mole %) of the $R_3$ units are linear or branched alkyl groups of 6 to 17 carbon atoms (this is representative of oleophilic hydroxycarboxylic acid). In yet another embodiment, at least 5 mole % (more desirably at least 10 or 20, and preferably at least 30 mole %) of the $R_3$ units are linear or branched alkyl groups of 1 or 2 carbon atoms (this is representative of repeat units from lactide or glycolic). In another embodiment, combinations of the at least amounts from the prior four sentences can be combined to get preferred polyester portions of the dispersant.

Specific examples of suitable diols include alkylene glycols such as ethylene glycol, propylene glycol, neopentyl glycol, 1,4-butanediol, 1,6-hexanediol, cis and trans 1,2- and 1,4-cyclohexanedimethanol, diols with ether linkages such as diethylene glycol, dipropylene glycol, tripropylene glycol and triethylene glycol, polyalkylene glycols such as polyethylene glycols, polypropylene glycols, polybutylene glycols, mixed block and random copolymers of polyethylene glycol and polypropylene glycol (Pluronic™ and reverse Pluronic™ ex BASF) with MW less than 1000.

Specific examples of the dibasic acids, diesters and anhydrides include maleic anhydride, succinic anhydride, glutaric acid, fumaric acid, malonic acid, adipic acid, sebacic acid, phthalic anhydride, pimelic acid, dimer fatty acids and their hydrogenated versions, and cyclohexane dicarboxylic anhydride.

Examples of monocarboxylic acids used to initiate a) the polymerization of the lactones and/or the hydroxycarboxylic acids or b) the condensation of diols with dicarboxylic acids or their esterifiable derivatives such as anhydride, diesters and acid chlorides include C1-25 carboxylic acids which may be saturated, unsaturated, branched, alkyl or aryl and may be substituted with C1-4 alkoxy or halogen. Specific examples include propionic acid, oleic, palmitic, stearic, erucic, lauric, 2-ethylhexanoic, 9,11- and 9,12-linoleic, 9,12, 15-linolenic acids, abietic acid, methoxyacetic, 2,2-dimethyl butanoic acid and caproic acid.

The mono carboxylic acid ended polyester in one embodiment is prepared from a lactone and/or lactide and/or a hydroxycarboxylic acid at a temperature from 50 to 250° C., optionally in the presence of a mono carboxylic acid and optionally in the presence of an esterification catalyst. In one embodiment, the temperature is not less than 100° C. or not less than 150° C. In order to minimise any charring of the final product, the temperature is generally not greater than 200° C. In one embodiment, up to 20, 30 or 50 mole % of the combined lactone, lactide, and hydroxycarboxylic acid reactants are dihydroxycarboxylic acids.

The inert atmosphere may be provided by any inert gas of the Periodic Table but is generally nitrogen. In one embodiment, the reaction is carried out in the presence of an esterification catalyst such as a metal alkoxide such as zirconium butoxide, tetraisopropyltitanate or tetrabutyl titanate, a zinc salt of an organic acid, for example zinc acetate, a tin catalyst such as stannous chloride, stannous octylate, dibutyl tin dilaurate or monobutyl tin oxide or an acid catalyst such as toluene sulphonic acid or trifluoroacetic acid.

For reaction conditions and process steps for formation of the polyester chains using diols and diacids. Please see U.S. Pat. No. 5,760,257, column 5.

Step 2 is the conversion of the above-mentioned mono carboxylic acid functional polyester to an anhydride via reaction with a low boiling anhydride in the following fashion:

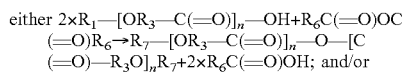

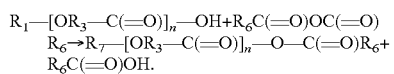

where $R_1$, $R_2$, $R_3$, and n are described above.

$R_6$ is a branched or linear hydrocarbon chain containing between 1 and 4 carbon atoms, preferably between 1 and 2 carbon.

$R_7$ is $R_2C(=O)-$ or $R_6C(=O)-$.

It should be noted that any mono acid functional polyester where $R_1$ is H, the end hydroxyl group will be converted to an ester group and be described as $R_6C(=O)-$, and hence why the terminal $R_1$ group of the polyester changes to $R_7$.

This process is carried out by mixing the mono functional acid polyester in the presences of molar excess of the low boiling anhydride at an elevated temperature. This temperature can be up to 15° C. lower than the boiling point of the low boiling anhydride if the reaction vessel has a set up where volatile material can be removed for example the use of a trap or open port, or at temperature up to the boiling point of the low boiling anhydride if the setup is such that any volatile material is returned for example the use of a condenser. Preferred low temperature boiling anhydrides are conveniently selected from the group consisting of acetic anhydride, propionic anhydride, and butyric anhydride.

After one to 24 hours of mixing, the remaining excess low boiling anhydride and any of its associated acid (that has not already been removed from the reaction vessel) can be removed by ensuring the reaction set up will allow volatile material to escape, for example, through the use of a trap or open port, and the temperature raised to be greater than the boiling point of the low boiling anhydride.

U.S. Pat. No. 2,411,567 teaches about synthesizing joint anhydrides of the acids using acetic anhydride but for non-polymeric acids.

Step 3 is the above synthesized anhydride of the mono functional acid polyester is then reacted with a polyamine to result in a mixture of amide and salt bonds between the polyesters and the polyamine, as shown by the below structure.

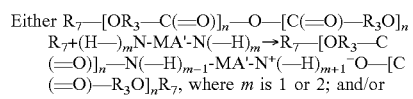

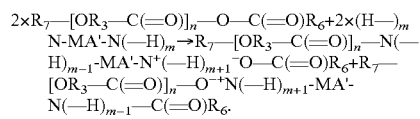

where $R_3$, $R_6$, $R_7$ and n are defined above and $(H-)_m$N-MA'-N$(-H)_m$ is used to represent MA the multi amine species with only 2 N$(-H)_m$ groups illustrated but containing between 6 and 1500 N$(-H)_m$ groups which may optionally react with additional anhydride and/or carboxylic acid species and m is 1 or 2 depending whether the nitrogen atom, N, is a primary or secondary amine group.

This reaction of the terminal anhydride group with an amine to form an amide linkage or carboxylic acid-amine salt can be carried out at reaction temperature lower than 100° C. and for short reaction times such as 10 minutes, as the amines of the polyamine will readily react with the anhydride, this can be confirmed by IR and the disappearance of the anhydride peak at approximately 1820 cm$^{-1}$. The limiting factor on the temperature and time of this reaction is the physical form of the 2 polymers (polyester and polyamine) and subsequently the ability to mix them efficiently and thoroughly to get a uniform reaction product, optionally the reaction may be carried out in a suitable solvent. These lower temperatures resulted in less reaction between the amine atoms and the ester linkages (resulting in less polyester chain scission).

MA is a polyamine and desirably has a number average molecular weight between 300 and 100,000 g mole and is selected from polyethyleneimine, modified polyethyleneimine, polyallylamine, modified polyallylamine, polyvinylamine, modified polyvinylamine or mixtures thereof. In one embodiment, it is preferred that at least 70, 80, 90 or 95 weight percent of the multi-amine species is polyethyleneimine. It is desirable that the multi-amine species has a number average molecular weight by ebullioscopic method analysis of from 500 to 600,000 g/mole, more desirably from about 1000 to 200,000 g/mole and preferably from about 1000 to 100,000 or from 8000 to 100,000 g/mole.

The polyamine MA in one embodiment is poly($C_{2-6}$-alkyleneimine) and/or polyethylene imine. The polyamine may be linear or branched. Linear polyethyleneimines may be prepared by hydrolysis of poly (N-acyl) alkyleneimines as described, for example, by Takeo Saegusa et al in Macromolecules, 1972, Vol. 5, page 4470. The branched polyethyleneimines of differing molecular weights are commercially available from BASF and Nihon Shokubai. Polyallylamine and poly-(N-alkyl) allylamines of differing molecular weights are commercially available from Nitto Boseki. Polyvinylamine of differing molecular weights are available from Mitsubishi Kasai. Poly(propyleneimine) dendrimers are commercially available from DSM Fine Chemicals and poly(amidoamine) dendrimers are available as "Starburst" dendrimers from Aldrich Chemical Co.

In one embodiment, the polyamine MA can be modified by reacting a portion of its primary and/or secondary amino groups with esters such as ethyl or butyl acetate, isocyanates such as phenyl isocyanate, lactones such as caprolactone and valerolactone, anhydrides such as succinic or maleic or phthalic anhydride, cyclic carbonates such as ethylene carbonate, or (meth)acrylates such as ethyl acrylate or 2-hydroxyethyl acrylate, while ensuring there are still primary and/or secondary amino groups of the modified polyamine that are unmodified and hence still in the amine form.

In one embodiment, the polyamine MA can be polyethylene imine and this can be modified by substituting one or more protons of the NH units by a C2-4 alkyleneoxy unit. Polyethyleneimine can be modified by alkoxylation using a C2-4 alkylene oxide such as ethylene oxide, propylene oxide, butylene oxide or mixtures thereof. Examples of alkoxylated polyethyleneimines are commercially available from BASF and Nihon Shokubai.

In one embodiment, the dispersant of Formula 1 can be further functionalized to adapt its properties and application performance to specific requirements. These modification reactions below are between the various reagents listed below and the amines of the polyamine species that have not already been reacted with the polyester anhydride in Step 3 detailed above. The modification of any remaining amino groups may take place in a way which is known to the skilled person. Such modifications are preferred when, for example, amino groups will react with a binder system into which the pigment paste is incorporated and cause flocculation.

The stated modifications are advantageous embodiments of the present invention and can be realized by:

a) reaction of one or more of the remaining free primary and secondary amino groups of the polyamine species with isocyanates, lactones, anhydrides, epoxides, cyclic carbonates, or (meth)acrylates. Specific examples of suitable isocyanates include phenyl isocyanate. Specific examples of suitable lactones include caprolactone and valerolactone. Reaction of one or more of the remaining free primary and secondary amino groups of the polyamine species with anhydrides are disclosed in U.S. Pat. Nos. 6,878,799 and 7,767,750. Specific examples of suitable anhydrides include maleic anhydride, succinic anhydride, phthalic anhydride, tetrahydrophthalic anhydride, methyltetrahydrophthalic anhydride, hexahydrophthalic anhydride, methylhexahydrophthalic anhydride, 1,8-naphthalic anhydride, optionally substituted with nitro or halogen substituents such as Cl and Br, isatoic anhydride, trimellitic anhydride, $C_{1-20}$ alkenyl and alkyl succinic anhydrides. Reaction of one or more of the remaining free primary and secondary amino groups of the polyamine species with epoxides is disclosed in JP4031471. Specific examples of suitable epoxides include styrene oxide, propylene oxide and ethylene oxide. Specific examples of suitable cyclic carbonates include ethylene carbonate and 2,2-dimethyltrimethylene carbonate. Specific examples of suitable (meth)acrylates includes ethyl acrylate and 2-hydroxyethyl acrylate;

b) salification and/or reaction of one or more of the remaining free primary, secondary or tertiary amino groups of the polyamine species with mono or polycarboxylic acids, mineral acids, phosphorus and polyoxometallate containing acids or strong acids. Suitable reagents for this purpose include hydrochloric acid, acetic acid, sulphuric acid, alkyl sulphonic acids, alkyl hydrogen sulphates or aryl sulphonic acids. Salification and/or reaction of one or more of the remaining free amino groups of the aminic polyamine species with mono or polycarboxylic acids or phosphorus containing acids are disclosed in JP9157374, US 2010/0017973 and US 2013/0126804. Specific examples of suitable mono carboxylic acids include optionally substituted C1-50 aliphatic monocarboxylic acids such as acetic acid, propionic acid, caproic acid, caprylic acid, 2-ethylhexanoic acid, nonanoic acid, decanoic acid, lauric acid, myristic acid, palmitic acid, oleic acid, linoleic acid, stearic acid, arachidic acid, erucic acid, behenic acid, methoxyacetic acid, mixtures of fatty acids derived from oils from naturally occurring sources such as sunflower oil, rape seed oil, castor oil and olive oil, branched alkyl carboxylic acids available under the trademark Isocarb™ (ex Sasol), Unicid™ acids which are linear C25-50 synthetic primary acids commercially available from Baker Hughes and aromatic carboxylic acids such as benzoic acid, salicylic acid and naphthoic acid. Specific examples of suitable polycarboxylic acids include succinic acid, malonic acid, adipic acid, sebacic acid, malic acid, fumaric acid, citric acid and tartaric acid. Specific examples of suitable phosphorus containing acids include phosphoric acid and phosphorous acid. Specific examples of suitable polyoxometallate containing acids include phosphomolybdic acid, phosphotungstic acid and silicomolybdic acid;

c) oxidation of one or more of the remaining free primary, secondary or tertiary amino groups of the polyamine species to nitrogen oxides;

d) quaternization of one or more of the remaining free tertiary amino groups of the polyamine species. This can be achieved using, alkyl sulfates, alkyl or aralkyl halides, halocarboxylic esters, alkyl oxalates or epoxides. Suitable reagents for this purpose include, dimethyl sulphate, benzyl chloride, methyl halides such as chlorine, bromine and iodine, dimethyl oxalate, ethylene oxide, propylene oxide and styrene oxide in the presence of acids, and propane (or butane) sultone; and e) reaction of one or more of the remaining free primary, secondary or tertiary amino groups of the polyamine species with one or more mono amino-reactive group terminated polymer(s) of MW 150-3000. Suitable examples of carboxylic acid terminated polyester, polyesteramide and polyamide polymers are disclosed in U.S. Pat. Nos. 4,224,212, 4,861,380, 5,700,395, 5,760,257, 6,197,877, 8,202,935, JP4866255, JP8010601, JP9157361, WO 2006/113258 and WO 2007/039605. Suitable examples of carboxylic acid terminated polyether polymers are disclosed in JP4248207, U.S. Pat. Nos. 7,767,750, 7,671,119, 7,872,070, 8,076,409 and 8,168,713. Suitable examples of phosphate, sulphate and sulphonate terminated polyester polymers are disclosed in U.S. Pat. Nos. 4,861,380 and 6,197,877. Suitable examples of (meth)acrylate terminated polyester, polyesteramide and polyamide polymers are disclosed in EP713894, JP3488001, JP2010-222522 and U.S. Pat. No. 8,202,935. Suitable examples of (meth)acrylate terminated polyether polymers are disclosed in U.S. Pat. No. 7,923,474 and JP2010-222522. Suitable examples of phosphate, sulphate and sulphonate terminated polyether, polyether/polyester, polyether/polyurethane and polyether/polyester/polyurethane polymers are disclosed in U.S. Pat. Nos. 5,130,463, 5,151,218, 6,111,054, 6,310,123, 7,595,416 and 8,202,935. Suitable examples of isocyanate terminated polyester and polyether polymers are disclosed in JP4031471, JP7149855 and WO 2007/039605. Suitable examples of epoxide or acetoacetoxy or cyclocarbonate terminated polyacrylate polymers are disclosed in U.S. Pat. No. 5,100,969.

One objective of the present invention is to provide compounds that are capable of improving the colour strength or other tinctorial properties, increasing a particulate solid load, and/or forming improved dispersions, having improved brightness of the final composition. This is achieved while also producing a composition with reduced viscosity, good dispersion stability, reduced particle size and reduced particle size distribution, reduced haze, improved gloss, and increased jetness (especially when the composition is black). The composition(s) of the present invention may also be stable under ambient storage, and high temperature storage conditions providing reduced discolouration/yellowing of final coatings.

The polymer of the invention herein is useful as a dispersant for various small particle dispersions such as suspendable pigments and particulates in various polar and non-polar media. The compositions of various particulates, the dispersant, and a continuous phase are useful as inks, coatings, paints, and millbases for coloring inks, coatings, and paints.

Thus, when the dispersant is to be used to disperse a particulate solid in a non-polar medium, preferably one or more of the hydroxy carboxylic acids containing a $C_{7-17}$-alk(en)ylene group are used. When a dispersant is desired to be used to disperse a particulate solid in a polar medium, it is preferred that one or more and especially all of the hydroxy carboxylic acids or lactones thereof contains a $C_{1-6}$-alkylene group.

INDUSTRIAL APPLICATION

The particulate solid present in the composition may be any inorganic or organic solid material which is substantially insoluble in the organic medium at the temperature concerned and which it is desired to stabilize in a finely divided form therein. The particulate solids may be in the form of a granular material, a fibre, a platelet or in the form of a powder, often a blown powder. In one embodiment, the particulate solid is a pigment.

The particulate solid (typically a pigment or filler) may have an average particle size measured by light scattering measurements of from 10 nanometers to 10 microns, or 10 nanometers to 1, 2, 3 or 5 microns, or 20 nanometers to 1, 2, 3 or 5 microns in diameter.

Examples of suitable solids are pigments for solvent inks; pigments, extenders, fillers, blowing agents and flame retardants for paints and plastic materials; dyes, especially disperse dyes; optical brightening agents and textile auxiliaries for solvent dyebaths; pigments for inks, toners and other solvent application systems; solids for oil-based and inverse-emulsion drilling muds; dirt and solid particles in dry cleaning fluids; metals; particulate ceramic materials and magnetic materials for ceramics, piezo ceramic printing, refractories, abrasives, foundry, capacitors, fuel cells, Ferro fluids, conductive inks, magnetic recording media, water treatment and hydrocarbon soil remediation; organic and inorganic monodisperse solids; metal, metal oxides and carbon for electrodes in batteries, fibers such as wood, paper, glass, steel, carbon and boron for composite materials; and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments." Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colors such as yellow and black, iron oxides of different colors such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of two or more of manganese, nickel, titanium, chromium, antimony, magnesium, praseodymium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, ball clays including natural, synthetic and expandable, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminsterfullerene, asphaltene, graphene, diamond, alumina, quartz, perlite, pegmatite, silica gel, wood flour, wood flake including soft and hard woods, saw dust, powdered paper/fibre, cellulosic fibres such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, incinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g. barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates; biocides or industrial microbial agents such as those mentioned in tables 2, 3, 4, 5, 6, 7, 8 and 9 of the chapter entitled "Industrial Microbial Agents" in Kirk-Othmer's Encyclopedia of Chemical Technology, Vol. 13, 1981, $3^{rd}$ Edition, and agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid. By the term "polar," in relation to the organic liquid, it is meant that an organic liquid is capable of forming moderate to strong bonds as described in the article entitled "A Three Dimensional Approach to Solubility" by Crowley et al in Journal of Paint Technology, Vol. 38, 1966, page 269. Such organic liquids generally have a hydrogen bonding number of 5 or more as defined in the above-mentioned article.

Examples of suitable polar organic liquids are amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol (also known as 2-methylpropanol), terpineol and dialkyl and cyclic ethers such as diethyl ether and tetrahydrofuran. In one embodiment, solvents are alkanols, alkane carboxylic acids and esters of alkane carboxylic acids. In one embodiment, the present invention is suitable for organic liquids that are substantially non-soluble in an aqueous medium. Furthermore, a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, medium oil alkyd, short oil alkyd, polyether polyols and multi-media resins such as acrylic and urea/aldehyde.

The organic liquid may be a polyol, that is to say, an organic liquid with two or more hydroxyl groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated), halogenated aliphatic hydrocarbons (e.g. dichloromethane, carbon tetrachloride, chloroform, trichloroethane) and natural non-polar organics (e.g. vegetable oil, sunflower oil, rapeseed oil, linseed oil, terpenes and glycerides).

In one embodiment, the organic liquid comprises at least 0.1% by weight, or 1% by weight or more of a polar organic liquid based on the total organic liquid. In one embodiment, the organic liquid is free of water.

The plastics material may be a thermosetting resin. The thermosetting resins useful in this invention include resins which undergo a chemical reaction when heated, catalyzed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

In one embodiment, the thermosetting composite or thermosetting plastic may be a polyester, a polyvinyl acetate, a polyester resin in styrene, a polystyrene, or mixtures thereof.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and diphenylmethane diisocyanates.

If desired, the compositions of the present invention may contain other ingredients, for example resins (where these do not already constitute the organic medium), binders, co-solvents, cross-linking agents, fluidising agents, wetting agents, anti-sedimentation agents, plasticisers, surfactants, dispersants other than the compound of the present invention, humectants, anti-foamers, anti-cratering agents, rheology modifiers, heat stabilizers, light stabilizers, UV absorbers, antioxidants, leveling agents, gloss modifiers, biocides and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The compositions containing an organic liquid may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by high speed mixing, ball milling, basket milling, bead milling, gravel milling, sand grinding, attrition grinding, two roll or three roll milling, plastic milling until the dispersion is formed. Alternatively, the solid may be treated to reduce its particle size independently or in admixture with either the organic medium or the dispersant, the other ingredient or ingredients then being added and the mixture being agitated to provide the composition. The composition can also be made by grinding or milling the dry solid with the dispersant and then adding the liquid medium or mixing the solid with the dispersant in a liquid medium in a pigment flushing process.

The composition of the present invention is particularly suited to liquid dispersions. In one embodiment, such dispersion compositions comprise:
  a) from 0.5 to 80 parts of a particulate solid;
  b) from 0.1 to 79.6 parts of a polymer/dispersant of Formula 1; and
  c) from 19.9 to 99.4 parts of an organic liquid.
wherein all relative parts are by weight and the amounts (a)+(b)+(c)=100.

In one embodiment, component a) comprises from 0.5 to 30 parts of a pigment and such dispersions are useful as (liquid) inks, paints and millbases.

If a composition is required comprising a particulate solid and a dispersant of Formula 1 in dry form, the organic liquid is typically volatile so that it may be readily removed from the particulate solid by a simple separation means such as evaporation. In one embodiment, the composition comprises the organic liquid.

If the dry composition consists essentially of the dispersant of formula (1) and the particulate solid, it typically contains at least 0.2%, at least 0.5% or at least 1.0% dispersant of Formula 1 based on weight of the particulate solid. In one embodiment, the dry composition contains not greater than 100%, not greater than 50%, not greater than 20% or not greater than 10% by weight of dispersant of Formula 1 based on the weight of the particulate solid.

As disclosed herein, the compositions of the invention are suitable for preparing millbases wherein the particulate solid is milled in an organic liquid in the presence of a compound for Formula 1.

Thus, according to a still further aspect of the invention, there is provided a millbase comprising a particulate solid, an organic liquid and a polymer of formula (1).

Typically, the millbase contains from 20 to 70% by weight particulate solid based on the total weight of the millbase. In one embodiment, the particulate solid is not less than 10 or not less than 20% by weight of the millbase. Such millbases may optionally contain a binder added either before or after milling.

In one embodiment, the binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, nitrocellulose, and natural proteins such as casein. The binder may be nitrocellulose. In one embodiment, the binder is present in the composition at more than 100% based on the amount of particulate solid, more than 200%, more than 300% or more than 400%.

The amount of optional binder in the millbase can vary over wide limits but is typically not less than 10%, and often not less than 20% by weight of the continuous/liquid phase of the millbase. In one embodiment, the amount of binder is not greater than 50% or not greater than 40% by weight of the continuous/liquid phase of the millbase.

The amount of dispersant in the millbase is dependent on the amount of particulate solid but is typically from 0.5 to 5% by weight of the millbase.

Dispersions and millbases made from the composition of the invention are particularly suitable for use in non-aqueous and solvent free formulations in which energy curable systems (ultra-violet, laser light, infra-red, cationic, electron beam, microwave) are employed with monomers, oligomers, etc. or a combination present in the formulation. They are particularly suitable for use in coatings such as paints, varnishes, inks, other coating materials and plastics. Suitable examples include their use in low, medium and high solids paints, general industrial paints including baking, two component and metal coating paints such as coil and can coatings, powder coatings, UV-curable coatings, wood varnishes; inks, such as flexographic, gravure, offset, lithographic, letterpress or relief, screen printing and printing inks for packaging printing, non-impact inks such as inkjet inks including continuous inkjet and drop on demand inkjet which include thermal, piezo and electrostatic, phase change inks and hot melt wax inks, inks for ink-jet printers and print varnishes such as overprint varnishes; polyol and plastisol dispersions; non-aqueous ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, cosmetics, personal care like nail coatings, sunscreens, adhesives, toners such as liquid toners, plastics materials and electronic materials such as coating formulations for color filter systems in displays including organic light-emitting diode (OLED) devices, liquid crystal displays and electrophoretic displays, glass coatings including optical fiber coatings, reflective coatings or anti-reflective coatings, conductive and magnetic inks and coatings. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge N.J., (1990) and subsequent editions.

In one embodiment, the composition of the invention further includes one or more additional known dispersants.

The following examples provide illustrations of the invention. These examples are non exhaustive and are not intended to limit the scope of the invention.

EXAMPLES

Reagents
Lauric acid from Sigma Aldrich
ε-Caprolactone from Sigma Aldrich
δ-Valerolactone from Sigma Aldrich
(L+D)-Lactide from Sigma Aldrich
L-Lactide from Sigma Aldrich
Ricinoleic acid from Jayant Agro Organics Limited India
Zirconium (IV) butoxide solution from Sigma Aldrich, 80 wt. % in 1-butanol Acetic anhydride from Sigma Aldrich
Epomin SP018 polyethyleneimine from Nippon Shokubai, MW 1800
3-Dimethylaminopropylamine from Sigma Aldrich
Dimethyl sulphate from Sigma Aldrich
U.S. Pat. No. 6,197,877 Example 198—this is made in accordance to the example 198 from U.S. Pat. No. 6,197,877, with the exception that amine diethanolamine is not added and hence the material is present in its acid form.
Orthophosphoric acid from Sigma Aldrich
3-Isopropenyl-α,α-dimethylbenzylisocyanate from Sigma Aldrich
2-Butanone from Fisher Scientific
Acetic anhydride from Fisher Scientific
Propionic anhydride from Sigma Aldrich
Dowanol MPA from Sigma Aldrich
Phthalic anhydride from Sigma Aldrich
Dimethyl sulphate from Sigma Aldrich
Ethyl acrylate from Sigma Aldrich
Epomin SP012 polyethyleneimine from Nippon Shokubai, MW 1200
Epomin SP006 polyethyleneimine from Nippon Shokubai, MW 600
Triethylenetetramine from Sigma Aldrich
2,2-Bis(hydroxymethyl)butyric acid from sigma Aldrich
Step 1—Polyester 1

Charged lauric acid (696.64 parts), ε-caprolactone (3562.51 parts by wt.), and lactide (1747.09 parts) to reaction vessel and heated to 100° C. under nitrogen. When at temperature, charged zirconium butoxide solution (41.80 parts) and increased the temperature to 180° C. After seven hours, reaction stopped to yield a viscous liquid/paste, with an acid value of 34.05 mgKOH/g, this is a carboxylic acid terminated polyester called Polyester 1.

Step 1—Polyester 2

Charged lauric acid (117.38 parts), ε-caprolactone (281.24 parts by wt.), valerolactone (246.72 parts) and lactide (352.82 parts) to reaction vessel and heated to 100° C. under nitrogen. When at temperature, charged zirconium butoxide solution (7.01 parts) and increased the temperature to 180° C. After seven hours, reaction stopped to yield a viscous liquid/paste, with an acid value of 36.97 mgKOH/g, this is a carboxylic acid terminated polyester called Polyester 2.

Step 1—Polyester 3

Charged lauric acid (30.66 parts), ε-caprolactone (314.28 parts by wt.), and lactide (154.27 parts) to reaction vessel and heated to 100° C. under nitrogen. When at temperature, charged zirconium butoxide solution (3.50 parts) and increased the temperature to 180° C. After seven hours, reaction stopped to yield a viscous liquid/paste, with an acid value of 23.36 mgKOH/g, this is a carboxylic acid terminated polyester called Polyester 3.

Step 1—Polyester 4

Charged lauric acid (130.24 parts), ε-caprolactone (247.88 parts by wt.), and lactide (121.72 parts) to reaction vessel and heated to 100° C. under nitrogen. When at temperature, charged zirconium butoxide solution (3.50 parts) and increased the temperature to 180° C. After seven hours, reaction stopped to yield a viscous liquid/paste, with an acid value of 76.32 mgKOH/g, this is a carboxylic acid terminated polyester called Polyester 4.

Step 1—Polyester 5

Charged ricinoleic acid (252.28 parts) to reaction vessel and heated to 100° C. under nitrogen. When at temperature, charged zirconium butoxide solution (0.76 parts) and increased the temperature to 195° C. After fourteen hours, reaction stopped to yield a viscous liquid/paste, with an acid value of 33.64 mgKOH/g, this is a carboxylic acid terminated polyester called Polyester 5.

Step 1—Polyester 6

Charged lauric acid (34.72 parts), ε-caprolactone (178.1 parts by wt.), and L-lactide (87.3 parts) to reaction vessel and heated to 100° C. under nitrogen. When at temperature, charged zirconium butoxide solution (2.10 parts) and increased the temperature to 180° C. After seven hours, reaction stopped to yield a viscous liquid/paste, with an acid value of 30.21 mgKOH/g, this is a carboxylic acid terminated polyester called Polyester 6.

Step 1—Polyester 7

Charged lauric acid (30.49 parts), ε-caprolactone (171.1 parts by wt.), and L-lactide (57.03 parts) to reaction vessel and heated to 100° C. under nitrogen. When at temperature, charged zirconium butoxide solution (0.78 parts) and increased the temperature to 180° C. After 18 hours, reaction stopped to yield a viscous liquid/paste, with an acid value of 37.49 mgKOH/g, this is a carboxylic acid terminated polyester called Polyester 7.

Step 1—Polyester 8

2,2-Bis(hydroxymethyl)butyric acid (7.76 parts), ε-caprolactone (35.85 parts), δ-valerolactone (31.45 parts) and lauric acid (10.49 parts) were charged to a reaction vessel and heated to 120° C. under nitrogen, after one hour charged zirconium butoxide solution (0.26 parts) and increased the temperature to 180° C. After 20 hours reaction stopped to yield yellow liquid, this is branched polyester 8.

Step 2—Polyester Anhydride 1

Charged Polyester 1 (250.02 parts) and acetic anhydride (19.05 parts) to a reaction vessel and heated to 120° C. under nitrogen with a dean and stark trap fitted to the reaction vessel. After a further six hours, increased the temperature to 150° C. After a further 17 hours, removed the dean and stark trap to leave an open port. After a further one hour, reaction stopped and poured off to yield a viscous liquid/paste, this is an anhydride terminated version of the above polyester and is called Polyester anhydride 1.

Step 2—Polyester Anhydride 2

Charged Polyester 2 (250.09 parts) and acetic anhydride (20.15 parts) to a reaction vessel and heated to 120° C. under nitrogen with a dean and stark trap fitted to the reaction vessel. After a further six hours, increased the temperature to 150° C. After a further 17 hours, removed the dean and stark trap to leave an open port. After a further one hour, reaction stopped and poured off to yield a viscous liquid/paste, this is an anhydride terminated version of the above polyester and is called Polyester anhydride 2.

Step 2—Polyester Anhydride 3

Charged Polyester 3 (85.75 parts) and acetic anhydride (4.29 parts) to a reaction vessel and heated to 120° C. under nitrogen with a dean and stark trap fitted to the reaction vessel. After a further six hours, increased the temperature to 150° C. After a further 17 hours, removed the dean and stark trap to leave an open port. After a further one hour, reaction stopped and poured off to yield a viscous liquid/paste, this is an anhydride terminated version of the above polyester and is called Polyester anhydride 3.

Step 2—Polyester Anhydride 4

Charged Polyester 4 (101.32 parts) and acetic anhydride (16.91 parts) to a reaction vessel and heated to 120° C. under nitrogen with a dean and stark trap fitted to the reaction vessel. After a further six hours, increased the temperature to 150° C. After a further 17 hours, removed the dean and stark trap to leave an open port. After a further one hour, reaction stopped and poured off to yield a viscous liquid/paste, this is an anhydride terminated version of the above polyester and is called Polyester anhydride 4.

Step 2—Polyester Anhydride 5

Charged Polyester 5 (144.5 parts) and acetic anhydride (19.46 parts) to a reaction vessel and heated to 120° C. under nitrogen with a dean and stark trap fitted to the reaction vessel. After a further six hours, increased the temperature to 150° C. After a further 17 hours, removed the dean and stark trap to leave an open port. After a further one hour, reaction stopped and poured off to yield a viscous liquid/paste, this is an anhydride terminated version of the above polyester and is called Polyester anhydride 5.

Step 2—Polyester Anhydride 6

Charged Polyester 1 (109.68 parts) and propionic anhydride (10.69 parts) to a reaction vessel and heated to 140° C. under nitrogen with a dean and stark trap fitted to the reaction vessel. After a further six hours, increased the temperature to 170° C. After a further 17 hours, removed the dean and stark trap to leave an open port. After a further one hour, reaction stopped and poured off to yield a viscous liquid/paste, this is an anhydride terminated version of the above polyester and is called Polyester anhydride 6.

Step 2—Polyester Anhydride 7

Charged Polyester 6 (144.16 parts) and acetic anhydride (9.50 parts) to a reaction vessel and heated to 120° C. under nitrogen with a dean and stark trap fitted to the reaction vessel. After a further six hours, increased the temperature to 150° C. After a further 17 hours, removed the dean and stark trap to leave an open port. After a further one hour, reaction stopped and poured off to yield a viscous liquid/paste, this is an anhydride terminated version of the above polyester and is called Polyester anhydride 7.

Step 2—Polyester Anhydride 8

Charged Polyester 7 (209.17 parts) and acetic anhydride (15.81 parts) to a reaction vessel and heated to 120° C. under nitrogen with a dean and stark trap fitted to the reaction vessel. After a further six hours, increased the temperature to 150° C. After a further 17 hours, removed the dean and stark trap to leave an open port. After a further one hour, reaction stopped and poured off to yield a viscous liquid/paste, this is an anhydride terminated version of the above polyester and is called Polyester anhydride 8.

Step 2—Polyester Anhydride 9

Branched polyester 8 (60.86 parts) and acetic anhydride (7.36 parts) were charged to a reaction vessel under nitrogen and heated to 120° C., after 4 hours the temperature was increased to 150° C. and the reaction stirred for a further 26 hours, to yield a yellow liquid, branched polyester anhydride 9.

Step 3—Dispersant 1

Charged Polyester anhydride 1 (49.34 parts) to a reaction vessel and heated to 70° C. under nitrogen, then charged Epomin SP018 (3.80 parts, which had been pre heated to 70° C.). After one hour, stopped the reaction to yield a viscous liquid/paste, with an acid value of 25.2 mgKOH/g and a base equivalence of 1489.15 this is Dispersant 1.

Step 3—Dispersant 2

Charged Polyester anhydride 1 (37.50 parts) to a reaction vessel and heated to 70° C. under nitrogen, then charged Epomin SP018 (12.50 parts which had been pre heated to 70° C.). After one hour, stopped the reaction to yield a viscous liquid/paste, with an acid value of 26.71 mgKOH/g and a base equivalence of 413.96 this is Dispersant 2.

Step 3—Dispersant 3

Charged Polyester anhydride 1 (30.72 parts) to a reaction vessel and heated to 70° C. under nitrogen, then charged Epomin SP018 (1.50 parts which had been pre heated to 70° C.). After one hour, stopped the reaction to yield a viscous liquid/paste, with an acid value of 26.18 mgKOH/g and a base equivalence of 2220.07 this is Dispersant 3.

Step 3—Dispersant 4

Charged Polyester anhydride 2 (25.07 parts) to a reaction vessel and heated to 70° C. under nitrogen, then charged Epomin SP018 (1.50 parts which had been pre heated to 70° C.) and 2-butanone (53.58 parts). After one hour, stopped the reaction to yield a low viscous liquid, with an acid value of 9.51 mgKOH/g and a base equivalence of 4412.13 this is Dispersant 4.

Step 3—Dispersant 5

Charged Polyester anhydride 3 (35.57 parts) to a reaction vessel and heated to 70° C. under nitrogen, then charged Epomin SP018 (2.74 parts which had been pre heated to 70° C.). After one hour, stopped the reaction to yield a viscous liquid/paste, with an acid value of 46.32 mgKOH/g and a base equivalence of 1390.45 this is Dispersant 5.

Step 3—Dispersant 6

Charged Polyester anhydride 4 (51.39 parts) to a reaction vessel and heated to 70° C. under nitrogen, then charged Epomin SP018 (3.95 parts which had been pre heated to 70° C.). After one hour, stopped the reaction to yield a viscous liquid/paste, with an acid value of 21.52 mgKOH/g and a base equivalence of 1835.20 this is Dispersant 6.

Step 3—Dispersant 7

Charged Polyester anhydride 6 (45.82 parts) to a reaction vessel and heated to 70° C. under nitrogen, then charged Epomin SP018 (3.53 parts), which had been pre heated to 70° C. After one hour, stopped the reaction to yield a viscous liquid/paste, with an acid value of 21.57 mgKOH/g and a base equivalence of 1498.59 this is Dispersant 7.

Step 3—Dispersant 8

Charged Polyester anhydride 7 (45.68 parts) to a reaction vessel and heated to 70° C. under nitrogen, then charged Epomin SP018 (3.52 parts), which had been pre heated to 70° C. After one hour, stopped the reaction to yield a viscous liquid/paste, with an acid value of 22.99 mgKOH/g and a base equivalence of 4609.27 this is Dispersant 8.

Step 3—Dispersant 9

Charged Dispersant 1 (97.49 parts) to a reaction vessel and heated to 70° C. under nitrogen, then charged phthalic anhydride (1.95 parts) and Dowanol MPA (99.90 parts), which had been pre heated to 70° C. After one hour, stopped the reaction to yield a viscous liquid/paste, with an acid value of 17.73 mgKOH/g and a base equivalence of 3772.14 this is Dispersant 9.

Step 3—Dispersant 10

Charged Dispersant 1 (101.78 parts) to a reaction vessel and heated to 70° C. under nitrogen, then charged dimethylsulphate (2.10 parts) which had been pre heated to 70° C. Dowanol MPA (103.1 parts). After one hour, stopped the reaction to yield a viscous liquid/paste, with an acid value of 15.48 mgKOH/g and a base equivalence of 4609.27 this is Dispersant 10.

Step 3—Dispersant 11

Charged Dispersant 1 (98.72 parts) to a reaction vessel and heated to 70° C. under nitrogen, then charged ethyl acrylate (1.97 parts), which had been pre heated to 70° C. After one hour, stopped the reaction to yield a viscous liquid/paste, with an acid value of 25.39 mgKOH/g and a base equivalence of 1803.49 this is Dispersant 11.

Step 3—Dispersant 12

Charged Dispersant 1 (98.03 parts) to a reaction vessel and heated to 70° C. under nitrogen, then charged caprolactone (1.97 parts), which had been pre heated to 70° C. and Dowanol MPA (99.92 parts). After one hour, stopped the reaction to yield a viscous liquid/paste, with an acid value of 13.95 mgKOH/g and a base equivalence of 3647.37 this is Dispersant 12.

Step 3—Dispersant 13

Charged Dispersant 1 (92.54 parts) to a reaction vessel and heated to 70° C. under nitrogen, then charged U.S. Pat. No. 6,197,877 Example 198 (1.95 parts), which had been pre heated to 70° C. After one hour, stopped the reaction to yield a viscous liquid/paste, with an acid value of 27.87 mgKOH/g and a base equivalence of 1727.16 this is Dispersant 13.

Step 3—Dispersant 14

Charged Dispersant 1 (78.72 parts) to a reaction vessel and heated to 70° C. under nitrogen, then charged ortho phosphoric acid (85% w/w 1.55 parts), which had been pre heated to 70° C. After one hour, stopped the reaction to yield a viscous liquid/paste, with an acid value of 30.25 mgKOH/g and a base equivalence of 1818.48 this is Dispersant 14.

Step 3—Dispersant 15

Charged Polyester anhydride 5 (49.17 parts) to a reaction vessel and heated to 70° C. under nitrogen, then charged Epomin SP018 (3.78 parts), which had been pre heated to 70° C. After one hour, stopped the reaction to yield a viscous liquid/paste, with an acid value of 16.96 mgKOH/g and a base equivalence of 1181.82 this is Dispersant 15.

Step 3—Dispersant 16

Charged Dispersant 1 (102.2 parts) to a reaction vessel and heated to 70° C. under nitrogen, then charged 3-Isopropenyl-α,α-dimethylbenzylisocyanate (2.04 parts). After one hour, stopped the reaction to yield a viscous liquid/paste, with an acid value of 23.39 mgKOH/g and a base equivalence of 1868.63 this is Dispersant 16.

Step 3—Dispersant 17

Charged Polyester anhydride 2 (40.02 parts) to a reaction vessel and heated to 70° C. under nitrogen, then charged Epomin SP012 (3.10 parts), which had been pre heated to 70° C. After one hour, stopped the reaction to yield a viscous liquid/paste, with an acid value of 33.39 mgKOH/g and a base equivalence of 1388.84 this is Dispersant 17.

Step 3—Dispersant 18

Charged Polyester anhydride 8 (39.32 parts) to a reaction vessel and heated to 70° C. under nitrogen, then charged Epomin SP006 (3.02 parts), which had been pre heated to 70° C. After one hour, stopped the reaction to yield a viscous liquid/paste, with an acid value of 28.19 mgKOH/g and a base equivalence of 1767.25 this is Dispersant 18.

Step 3—Dispersant 19

Charged Polyester anhydride 8 (33.00 parts) to a reaction vessel and heated to 70° C. under nitrogen, then charged Triethylenetetramine (2.54 parts), which had been pre heated to 70° C. After one hour, stopped the reaction to yield a viscous liquid/paste, with an acid value of 22.28 mgKOH/g and a base equivalence of 1664.46 this is Dispersant 19.

Step 3—Dispersant 20

Branched polyester anhydride 9 (40.84 parts) was charged to a reaction vessel and heated to 70° C. under nitrogen, when at temperature, charged Epomin SP-006 (3.14 parts, this had been pre-heated to 70° C.) and stirred for one hour. After this time, product poured of to yield a viscous yellow liquid, with an acid value of 27.75 mgKOH/g and an abase equivalence of 2307.36, this is Branched dispersant 20.

COMPARATIVE EXAMPLES

Comparative Example 1

Based off method for example 30 in U.S. Pat. No. 6,197,877. Charged Polyester 1 (77.47 parts) to reaction and heated to 70° C., then charged Epomin SP018 (5.95 parts, which had been pre-heated to 70° C.), and increased the temperature to 120° C. After six hours, reaction stopped to yield a viscous liquid/paste, with an acid value of 42.2 mgKOH/g and a base equivalence of 2013.9 this is Comparative example 1.

Comparative Example 2

Charged Polyester 5 (15.28 parts) to reaction and heated to 70° C., then charged Epomin SP018 (1.18 parts, which had been pre-heated to 70° C.), and increased the temperature to 120° C. After six hours, reaction stopped to yield a viscous liquid/paste, with an acid value of 20.00 mgKOH/g and a base equivalence of 1338.14 this is Comparative example 2.

APPLICATION TESTING

Application Testing Reagents
Dowanol MPA—from sigma Aldrich
Regal Black 400R—from Cabot
3 mm Glass beads—from Sigmund Lindner
Toluene—from Fisher Scientific
Photomer 4226—diproyleneglycol diacrylate from IGM resins
Photomer 5429—Polyester tetraacrylate from IGM resins
Solsperse 22000—yellow synergist from Lubrizol Ltd
Irgalite Yellow D1115—Pigment yellow 13 from BASF
Ebecryl EB 160—a triacrylate monomer from Allnex
Ebecryl EB 657—an Oligomer from Allnex
Photo initiator blend—is a mixture of Speedcure EDB (5 parts), Speedcure ITX (3 parts), Ebecryl EB 160 (8 parts), Ebecryl EB 40 (0.5 parts) and Dow Corning 57 (0.5 parts).

Speedcure EDB—from Lambson
Speedcure ITX—from Lambson
Ebecryl EB 40—from Allnex
Dow Corning 57—is an ink additive from Dow Corning
Application Results Each Dispersant (0.6 parts) indicated in Table 1 below was added to an 8 dram vial and Dowanol MPA (6.40 parts) was added. The dispersant was then dissolved by shaking and heating as necessary. When the dispersant was dissolved, 3 mm glass beads (17 parts) were added, followed by Regal Black 400R (3 parts). The vials were then sealed and shaken on a horizontal shaker for 16 hours. The resulting dispersion was then assessed for fluidity using an arbitrary scale of A to E (good to bad).

TABLE 1

Pigment Dispersion Results

| Example | Fluidity Grade |
|---|---|
| Comparative Example 1 | E |
| Dispersant 1 | A |
| Dispersant 2 | A |
| Dispersant 3 | C |
| Dispersant 4* | A |
| Dispersant 5 | A |
| Dispersant 6 | B |
| Dispersant 7 | A |
| Dispersant 8 | A |
| Dispersant 9* | A |
| Dispersant 10* | A |
| Dispersant 11 | A |
| Dispersant 12* | A |
| Dispersant 13 | A |
| Dispersant 14 | A |
| Dispersant 16 | A |
| Dispersant 17 | B |
| Dispersant 18 | A |
| Dispersant 19 | B |

Note all dispersants marked with a * are 50% active and hence twice as much dispersant is used (1.2 parts rather than 0.6 parts) and the extra weight is removed from the solvent used (5.80 parts rather than 6.40 parts).

Each Dispersant (0.6 parts) indicated in Table 2 below was added to an 8 dram vial and Toluene (6.40 parts) was added. The dispersant was then dissolved by shaking and heating as necessary. When the dispersant was dissolved, 3 mm glass beads (17 parts) were added, followed by Regal Black 400R (3 parts). The vials were then sealed and shaken on a horizontal shaker for 16 hours. The resulting dispersion was then assessed for fluidity using an arbitrary scale of A to E (good to bad).

TABLE 2

Pigment Dispersion Results

| Example | Fluidity Grade |
|---|---|
| Comparative Example 2 | A |
| Dispersant 15 | A |

Each Dispersant (2.88 parts) indicated in Table 3 below was added to an 8 ounce jar and with Photomer 4226 (46.66 parts) and Photomer 5429 (15.56 parts). The dispersant was then dissolved by shaking and heating as necessary. When the dispersant was dissolved, Solsperse 22000 (0.50 parts) was added along with Irgalite Yellow D1115 (14.40 parts) and 3 mm glass beads (250 parts) were added. The jars were then sealed and shaken on a scandex shaker for 4 hours, to give a mill base.

11.08 parts of each mill base was then taken and mixed with Ebecryl EB 160 (4.72 parts), Ebecryl EB 657 (0.80 parts) and Photo initiator blend (3.40 parts) in a vial, to yield an Ink. These inks were then stored in a 50° C. oven for 1 week, then removed from the oven and their viscosity measured on a TA instruments Discovery Hybrid HR-1 rheometer at shear rate 100/s.

TABLE 3

Ink Storage Viscosity

| Example | Viscosity measurement Pa · s |
|---|---|
| Comparative Example 1 | Gel* |
| Dispersant 1 | 0.32 |

*This sample had become a solid gel in the vial and impossible to measure.

Gardener Colour Testing

The colour of the dispersants were measured against the Gardener Colour Scale using a Lovibond Comparator 2000+ and the results are recorded below in Table 4.

TABLE 4

Gardener Colour Results

| Example | Gardiner Colour |
|---|---|
| Comparative Example 1 | >18 |
| Dispersant 1 | 13 |
| Dispersant 2 | 12 |
| Dispersant 3 | 15 |
| Dispersant 4 | 10 |
| Dispersant 5 | >18 |
| Dispersant 6 | >18 |
| Dispersant 7 | 14 |
| Dispersant 8 | 7 |
| Dispersant 9 | 14 |
| Dispersant 10 | 14 |
| Dispersant 11 | 14 |
| Dispersant 12 | 14 |
| Dispersant 13 | 14 |
| Dispersant 14 | 14 |
| Dispersant 16 | 14 |
| Dispersant 17 | 13 |
| Dispersant 18 | 13 |
| Dispersant 19 | 13 |
| Comparative Example 2 | 17 |
| Dispersant 15 | 12 |

Application Results Dispersant 20

Dispersant 20 (0.25 parts by wt.) was added to a vial and Dowanol MPA (8.25 parts) was added. The dispersant was then dissolved by shaking and heating as necessary. When the dispersant was dissolved, 3 mm glass beads (17 parts) were added, followed by Heligen Blue L7101F (1.5 parts). The vial was then sealed and shaken on a horizontal shaker for 16 hours. The resulting dispersion was then assessed for fluidity and was graded an A.

As used herein, the transitional term "comprising", which is synonymous with "including", "containing," or "characterized by", is inclusive or open-ended and does not exclude additional, un-recited elements or method steps. However, in each recitation of "comprising" herein, it is intended that the term also encompass, as alternative embodiments, the phrases "consisting essentially of" and "consisting of", where "consisting of" excludes any element or step not specified and "consisting essentially of" permits the inclusion of additional un-recited elements or steps that do not materially affect the basic and novel characteristics of the composition or method under consideration.

While the invention has been explained in relation to its preferred embodiments, it is to be understood that various modifications thereof will become apparent to those skilled

What is claimed is:

1. A dispersant of the following structure:

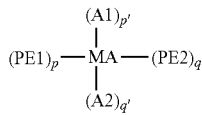

Formula 1 wherein:
MA is a multi-amine species;
PE1 is a polyester chain of number average molecular weight between 500 and 4,000 g/mole attached to the multi amine species (MA) via an amide bond;
wherein a carbonyl group is formed from a terminal group of PE1 and a nitrogen from the MA;
PE2 is a polyester chain of number average molecular weight between 500 and 4,000 g/mole attached to the multi amine species (MA) via a salt linkage;
wherein a deprotonated carboxylic acid group is formed from a terminal group of PE2 and a protonated nitrogen from the MA;
A1 is the residue of a $C_{2-5}$ carboxylic acid attached to the MA via an amide bond, wherein a carbonyl group is formed from a terminal group of A1 and a nitrogen from the MA;
A2 is the residue of a $C_{2-5}$ carboxylic acid attached to the MA via a salt linkage, wherein a deprotonated carboxylic acid group is formed from a terminal group of A2 and a protonated nitrogen from the MA;
the relative molar ratios of amide bonds represented by p and p' to salt linkages represented by q and q' are between 5:95 and 50:50;
p+p' can never be greater than q+q';
p is 1 or greater than 1, and p' is 1 or greater than 1;
q is 1 or greater than 1, and q' is 1 or greater than 1; and
p+p'+q+q' is between 4 and 2000.

2. The dispersant composition of claim 1, wherein MA is selected from the group consisting of a non-polymeric alkyl amine with 3 or more nitrogen atoms, polyvinylamine, or polyallylamine.

3. The dispersant composition of claim 1, wherein MA comprises polyethyleneimine or modified polyethyleneimine.

4. The dispersant of claim 1, wherein p+q is on average from 4 to 36.

5. The dispersant composition of claim 1, wherein said PE1 is of the formula $R_1-[OR_3-C(=O)]_n-$ and said PE2 is of the formula $R_1-[OR_3-C(=O)]_n-O^-$ wherein:
$R_1$ is H— or $R_2C(=O)-$;
$R_2$ is a branched or linear, saturated or unsaturated hydrocarbon chain containing between 1 and 25 carbons atoms;
$R_3$ is a branched or linear, saturated or unsaturated hydrocarbon chain containing between 1 and 25 carbons atoms or $-R_4-OC(=O)R_5-$;
$R_4$ is a branched or linear, saturated or unsaturated hydrocarbon chain containing between 2 and 30 carbons atoms;
$R_5$ is a branched or linear, saturated or unsaturated hydrocarbon chain containing between 1 and 20 carbons atoms; and
n is between 3 and 43.

6. The dispersant composition of claim 5, wherein at least 10 mole % of the $R_3$ units are linear or branched alkyl groups of 1 to 5 carbon atoms.

7. The dispersant composition of claim 5, wherein at least 5 mole % of the $R_3$ units are linear or branched alkyl groups of 4 and/or 5 carbon atoms.

8. The dispersant composition of claim 5, wherein at least 10 mole % of the $R_3$ units are linear or branched alkyl groups of 6 to 17 carbon atoms.

9. The dispersant composition of claim 5, wherein at least 5 mole % of the $R_3$ units are linear or branched alkyl groups of 1 or 2 carbon atoms.

10. The dispersant of claim 1, further comprising an amine group of said multi-amine species being a reaction product of: i) one more primary or secondary amines groups of said multi-amine species with (a) an isocyanate, lactone, epoxy, anhydride, cyclic carbonate, (meth)acrylate via Michael addition reaction, or a polymeric species having a group that reacts with a primary or secondary amine to form a salt or covalent bond; (b) an oxidizing species that could convert the amine group to a nitric oxide; or (c) a salification agent; or ii) a tertiary amine group reacted with a quaternization agent to form a quaternized amine group.

11. A coating, paint, ink or plastic comprising the dispersant of claim 1.

12. The dispersant composition of claim 1, wherein at least one of PE1 or PE2 independently comprises from 1 to 50 mole % of at least one di-hydroxy compound.

13. The dispersant composition of claim 12, wherein the at least one di-hydroxy compound comprises at least one of 2,2-bis(hydroxymethyl)butyric acid or 2,2-bis(hydroxymethyl)propionic acid.

14. The dispersant composition of claim 5, wherein $R_4$ is a branched or linear, saturated or unsaturated hydrocarbon chain containing between 2 and 30 carbons atoms, which contains 1 or more ether linkages.

* * * * *